United States Patent
Gonion

(10) Patent No.: US 8,527,737 B2
(45) Date of Patent: Sep. 3, 2013

(54) USING ADDRESSES TO DETECT OVERLAPPING MEMORY REGIONS

(75) Inventor: Jeffry E. Gonion, Campbell, CA (US)

(73) Assignee: Apple Inc., Cupertino, CA (US)

( * ) Notice: Subject to any disclaimer, the term of this patent is extended or adjusted under 35 U.S.C. 154(b) by 256 days.

(21) Appl. No.: 13/167,633

(22) Filed: Jun. 23, 2011

(65) Prior Publication Data

US 2011/0320763 A1   Dec. 29, 2011

Related U.S. Application Data

(60) Provisional application No. 61/357,677, filed on Jun. 23, 2010.

(51) Int. Cl.
*G06F 12/00* (2006.01)
(52) U.S. Cl.
USPC .................................. 711/210; 711/E12.078
(58) Field of Classification Search
None
See application file for complete search history.

(56) References Cited

U.S. PATENT DOCUMENTS

| 6,249,851 B1 * | 6/2001 | Richardson et al. .......... 711/167 |
| 6,393,512 B1 * | 5/2002 | Chen et al. ........................ 711/5 |
| 7,290,105 B1 * | 10/2007 | Jeter et al. ..................... 711/163 |
| 7,454,599 B2 * | 11/2008 | Jiao et al. ...................... 712/216 |
| 2006/0161918 A1 * | 7/2006 | Giers ............................. 718/102 |
| 2010/0042789 A1 * | 2/2010 | Gonion et al. ................ 711/154 |
| 2010/0122069 A1 * | 5/2010 | Gonion ......................... 712/216 |

* cited by examiner

*Primary Examiner* — Edward Dudek, Jr.
*Assistant Examiner* — Christopher Birkhimer
(74) *Attorney, Agent, or Firm* — Park, Vaughan, Fleming & Dowler, LLP

(57) ABSTRACT

The described embodiments determine if two addressed memory regions overlap. First, a first address for a first memory region and a second address for a second memory region are received. Then a composite address is generated from the first and second addresses. Next, an upper subset and a lower subset of the bits in the addresses are determined. Then, using the upper and lower subsets of the addresses, a determination is made whether the addresses meet a condition from a set of conditions. If so, a determination is made whether the lower subset of the bits in the addresses meet a criteria from a set of criteria. Based on the determination whether the lower subset of the bits in the addresses meet a criteria, a determination is made whether the memory regions overlap or do not overlap.

38 Claims, 3 Drawing Sheets

USING ADDRESSES TO DETECT OVERLAPPING MEMORY REGIONS

RELATED APPLICATIONS

This application is a non-provisional application from, and hereby claims priority under 35 U.S.C. §120 to, U.S. provisional patent application 61/357,677, entitled "Detection of Overlapping Addresses without the Use of Adders or Comparators," by inventors Jeffry E. Gonion and Keith E. Diefendorff, filed on 23 Jun. 2010.

BACKGROUND

1. Field

The described embodiments relate to techniques for improving the performance of computing devices. More specifically, the described embodiments relate to using addresses to detect overlapping memory regions in a computing device.

2. Related Art

Virtually all modern computing devices perform memory accesses (e.g., memory reads or writes) during which data in memory is accessed using corresponding addresses. Before performing certain types of memory accesses, however, an address must be compared with one or more other addresses to determine if the corresponding memory location can be accessed without causing an error (e.g., a read-after-write error, a write-after-read error, etc.). For example, in a vector processor that performs a group of memory write operations in parallel using one or more vectors of addresses, before the writes can be performed, the addresses may need to be checked against each other to determine if the addresses can be written without causing an error. If the vectors include addresses for overlapping memory regions, writing to each address in the vector of addresses in parallel can cause an error.

In some computing devices, detecting an overlap in the memory regions indicated by two addresses involves subtracting one of the addresses from the other address and comparing the result of the subtraction to the size of the memory region that is being addressed (e.g., byte, word, doubleword, etc.). Although performing such operations for a single pair of addresses does not require a much circuitry, when overlap must be simultaneously detected for more than a few addresses, the number of separate fast adder and comparison circuits proportionally increases. When overlap must be simultaneously detected for a large number of addresses, the amount of circuitry required can be prohibitive.

Because the size/area and power consumption of the circuits in the computing device is a concern, some computing devices are configured to perform the subtraction and comparison using only a lower subset of the address bits. This enables the simultaneous determination of overlap between addressed memory regions using a reduced number of circuits. However, even with this optimization, when a computing device must be able to simultaneously determine if there is overlap between the memory regions addressed by a large number of addresses, the number of circuits required can be significant. For example, when checking for overlap of addresses between two vectors of addresses of length L, $M=L*(L-1)/2$ comparisons are required. Because the large amount of circuitry is required, comparing vectors of addresses has been an expensive operation to implement (in terms of area/size and power consumption).

SUMMARY

The described embodiments provide a comparison mechanism that determines if a first memory region addressed using a first address and a second memory region addressed using a second address overlap. The comparison mechanism starts by receiving the first address for the first memory region and the second address for the second memory region, wherein each address comprises N bits and where the memory regions are of size S. The comparison mechanism then generates a composite address, wherein the composite address is a result of an exclusive-OR (XOR) of the first address and the second address. The comparison mechanism next determines an upper subset and a lower subset of the bits in the addresses based on the size S, wherein the addresses comprise the composite address, the first address, and the second address. The comparison mechanism then uses the upper subset of the bits and the lower subset of the bits in the addresses to determine if the first memory region and the second memory region overlap.

In some embodiments, when determining the upper subset and the lower subset of the bits in the addresses, for the lower subset, the comparison mechanism determines a subset that consists of bits $[0 \ldots \log_2 (S)]$ in the addresses, and for the upper subset, the comparison mechanism determines a subset that consists of bits $[\log_2 (S)+1 \ldots N-1]$ in the addresses.

In some embodiments, when using the upper subset of the bits and the lower subset of the bits in the addresses to determine if the memory regions overlap, upon determining that the upper subset of the bits in the composite address are all 0, if the lower subset in the composite address has a value of size S (e.g., given a memory region size 4, if the binary value of the lower subset of the composite address equals a 100), the comparison mechanism determines that the first memory region and the second memory region do not overlap. Otherwise, when the upper subset of the bits in the composite address are all 0, and the lower subset in the composite address does not have a value of size S, the comparison mechanism determines that the memory regions overlap when none of a set of criteria is met by the lower subset of the bits of the addresses, and determines that the memory regions do not overlap when one or more of the set of criteria is met by the lower subset of the bits of the addresses.

In some embodiments, the comparison mechanism performs one or more logical, combinatorial, or comparison operations to determine if the lower subset of the bits of the addresses meet the criteria.

In some embodiments, when using the upper subset of the bits and the lower subset of the bits in the addresses to determine if the memory regions overlap, upon determining that the upper subset of the bits in the composite address are not all 0, and that bit $[\log_2 (S)]$ of the lower subset in the composite address is 0, the comparison mechanism determines that the memory regions do not overlap.

In some embodiments, when using the upper subset of the bits and the lower subset of the bits in the addresses to determine if the memory regions overlap, upon determining that the upper subset of the bits in the composite address are not all 0, and that bit $[\log_2 (S)]$ of the lower subset in the composite address is 1, the comparison mechanism determines a bit position z, where bit position z is the rightmost bit position within the upper subset of address bits for the first address A and the second address B where $A[x]!=A [\log_2 (S)]$ or $B[x]!=B[\log_2 (S)]$. Upon determining that bit position z does not exist, or exists and has a predetermined property, the comparison mechanism determines that the memory regions overlap when one or more of the set of criteria is met by the lower subset of the bits of the addresses, and determines that the memory regions do not overlap when none of the set of criteria is met by the lower subset of the bits of the addresses.

In some embodiments, when determining that bit position z has the predetermined property, the comparison mechanism determines that: (1) bit position z is in bit [N−1] and bit position z of the composite address is 1; or (2) bit position z exists, bit position z of the composite address is 1, and all bits higher than bit z of the composite address are 0.

In some embodiments, upon determining that bit position z exists and does not have the predetermined property, the comparison mechanism determines that the memory regions do not overlap.

In some embodiments, when using the upper subset of the bits and the lower subset of the bits in the addresses to determine if the memory regions overlap, the comparison mechanism determines that the addresses meet a condition from a set of conditions using the upper subset of the bits and the lower subset of the bits in the addresses. The comparison mechanism then determines whether the lower subset of the bits in the addresses meet one or more criteria from a set of criteria. Based on the determination whether the lower subset of the bits in the addresses meet a criteria from the set of criteria, the comparison mechanism determines that the memory regions overlap or do not overlap.

In some embodiments, the comparison mechanism determines that the memory regions do not overlap when the upper subset of the bits and the lower subset of the bits in the addresses do not meet a condition from a set of conditions.

In some embodiments, when determining that the addresses meet a condition, the comparison mechanism determines that the bits of the upper subset of the composite address are 0, and that a value in the lower subset of the composite address is a value other than the size S. In these embodiments, when determining that the memory regions overlap or do not overlap, the comparison mechanism determines that the memory regions overlap when the lower subset of the bits of the addresses do not meet a criteria, and determines that the memory regions do not overlap when the lower subset of the bits of the addresses meet a criteria.

In some embodiments, when determining that the addresses meet a condition, the comparison mechanism determines that one or more bits in the upper subset of the composite address is 1, that bit $[\log_2(S)]$ of the composite address is 1, and, for a bit position z, where bit position z is the rightmost bit position within the upper subset of address bits for the first address A and the second address B where $A[x]!=A[\log_2(S)]$ or $B[x]!=B[\log_2(S)]$, that one of the following conditions is met: (1) there is no bit position z; (2) bit position z is at bit [N−1] of the first address or the second address, and bit position z of the composite address is 1; or (3) bit position z exists, bit position z of the composite address is 1, and bits above bit position z in the composite address are 0. In these embodiments, when determining that the memory regions overlap or do not overlap, the comparison mechanism is configured to determine that the memory regions overlap when the lower subset of the bits of the addresses meet a criteria, and determine that the memory regions do not overlap when the lower subset of the bits of the addresses do not meet a criteria.

In some embodiments, determining whether the lower subset of the bits of the addresses meet one or more criteria from the set of criteria comprises performing one or more logical, combinatorial, or comparison operations to determine if the lower subset of the bits of the addresses meet the criteria.

BRIEF DESCRIPTION OF THE FIGURES

In the figures, like reference numerals refer to the same figure elements.

DETAILED DESCRIPTION

Figure 1:
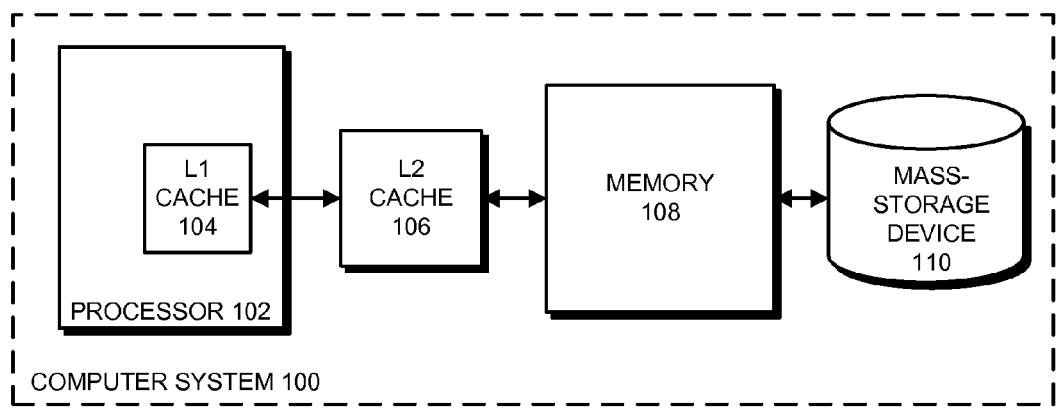
FIG. 1 presents a block diagram of a computer system in accordance with the described embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory and non-volatile memory, such as magnetic and optical storage devices such as disk drives, magnetic tape, CDs (compact discs), DVDs (digital versatile discs or digital video discs), or other media capable of storing data structures or code. Note that the computer-readable storage medium in the claimed embodiments is not intended to include non-statutory computer readable storage mediums such as transitory signals.

The methods and processes described in this detailed description can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules. In some embodiments, the hardware modules include one or more general-purpose circuits that are configured by executing instructions to perform the methods and processes.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Overview

The described embodiments determine if the memory regions addressed using two addresses overlap. More specifically, the described embodiments determine if a first memory region of size S addressed using first address A overlaps a second memory region of size S addressed using a second address B, where addresses A and B are N bits in length. The described embodiments comprise a comparison mechanism that performs the operations for determining if the memory regions overlap.

When determining if the memory regions overlap, the comparison mechanism first generates a composite address C that is the result of an exclusive-OR (XOR) of addresses A and B. The comparison mechanism then performs a number of operations using addresses A, B, and C (collectively, "the addresses") to determine if the addresses meet one or more conditions from a set of conditions. When the addresses do not meet any of the conditions, the comparison mechanism determines that there is no overlap. Otherwise, when the addresses meet one of the conditions, the comparison mechanism determines that overlap between the memory regions can be determined as a function of lower subsets of the address bits from addresses A, B, and/or C. The comparison mechanism then determines if the lower subsets of the address bits from addresses A, B, and/or C meet a criteria from a set of criteria, and, based on the determination, determines whether the addressed memory regions overlap.

The conditions that the comparison mechanism determines if the addresses meet are generally conditions that indicate that overlap between the memory regions can be determined as a function of a lower subset of the address bits of addresses A, B, and/or C. For example, the comparison mechanism can determine if one or more of the addresses conforms to one or more predetermined bit patterns that indicate that overlap between the memory regions can be determined as a function of a lower subset of the address bits of addresses A, B, and/or C. Generally, the conditions checked for by the comparison mechanism vary depending on the criteria that are used to determine overlap. Exemplary conditions are described below.

When determining if the lower subset of the address bits from addresses A, B, and/or C meet one or more criteria from the set of criteria, the comparison mechanism performs one or more logical, combinatorial, and/or comparison operations to make the determination. For example, in some embodiments, the criteria include whether the lower subset of at least one of the addresses conforms to a given bit pattern, and whether a corresponding logical operation for which the input is a lower subset of at least one of the addresses has a predetermined result. Exemplary criteria (and corresponding conditions) are described below.

Using these techniques, the described embodiments can determine if there is overlap between the addresses by performing simple comparison and logical operations—with less circuitry than is required by existing systems. This means that the circuits for performing the comparison in the described embodiments are smaller in size, less complex, and less power hungry than circuits for determining if addresses overlap in existing systems. Because this is true, the described embodiments can more easily be configured to perform overlap determination operations for larger numbers of addresses.

Terminology

Throughout the description, we use the following terminology. These terms may be generally known in the art, but are described below to clarify the subsequent descriptions.

In describing performing operations for vector instructions and vectors, the terms "before"/"lower" and "after"/"higher" may be used to describe the relative positions of elements. Generally, an element that is "before" or "lower" than another element in a vector or vector instruction has a lower vector index, e.g., element vector[0] is before element vector[1]. In vectors for which the indices for elements increase from right to left, an element is before/lower than another element when it is to the right of the element. The opposite is true when the vector indices increase from left to right. An element that is "higher" or "after" another element in a vector or vector instruction has a higher vector index. In vectors for which the indices for elements increase from right to left, an element is after/higher than another element when it is to the left of the element. The opposite is true when the vector indices increase from left to right.

In addition, the terms "first" and "last" as applied to elements in a vector or a vector instruction for which the indices for elements increase from right to left indicate the rightmost and leftmost elements, respectively. The opposite is true when the vector indices increase from left to right.

In describing the embodiments, we describe certain bits in addresses being equal to or having the value of memory region size S. Generally, this means that the value of the bits when considered as their binary equivalent are equal to or have the value of the size S. For example, for a memory region that is 4 bytes in size, in order to be equal to or to have the value of size S, the bits would be 100. As another example, for a memory region that is 8 bytes in size, in order to be equal to or have the value of size S, the bits would be 1000.

In describing the embodiments, the term "some embodiments" is used. Generally, the term indicates that the described aspect is present in a subset of the described embodiments. However, different instances of the term "some embodiments" may describe different subsets of the possible embodiments.

Computer System

FIG. 1 presents a block diagram of a computer system 100 in accordance with the described embodiments. Computer system 100 includes processor 102, L2 cache 106, memory 108, and mass-storage device 110. Processor 102 includes L1 cache 104.

Processor 102 can be a general-purpose processor that performs computational operations. For example, processor 102 can be a central processing unit (CPU) such as a microprocessor, a controller, an application-specific integrated circuit (ASIC), or a field-programmable gate array (FPGA). In the described embodiments, processor 102 has one or more mechanisms for vector processing (i.e., vector execution units).

Mass-storage device 110, memory 108, L2 cache 106, and L1 cache 104 are computer-readable storage devices that collectively form a memory hierarchy that stores data and instructions for processor 102. Generally, mass-storage device 110 is a high-capacity, non-volatile memory, such as a disk drive or a large flash memory, with a large access time, while L1 cache 104, L2 cache 106, and memory 108 are smaller, faster semiconductor memories that store copies of frequently used data. Memory 108 is typically a dynamic random access memory (DRAM) structure that is larger than L1 cache 104 and L2 cache 106, whereas L1 cache 104 and L2 cache 106 are typically comprised of smaller static random access memories (SRAM). In some embodiments, L2 cache 106, memory 108, and mass-storage device 110 are shared between one or more processors in computer system 100. Such memory structures are well-known in the art and are therefore not described in more detail.

Computer system 100 can be (or can be incorporated into) many different types of electronic devices. For example, computer system 100 can be part of a desktop computer, a laptop computer, a tablet computer, a server, a media player, an appliance, a cellular phone, a piece of testing equipment, a network appliance, a personal digital assistant (PDA), a hybrid device (i.e., a "smart phone"), or another electronic device.

Although we use specific components to describe computer system 100, in alternative embodiments, different numbers and/or types of components may be present in computer system 100. For example, computer system 100 may not include some of the memory hierarchy (e.g., memory 108 and/or mass-storage device 110). Computer system 100 may also include one or more additional processors, wherein the processors share some or all of L2 cache 106, memory 108, and mass-storage device 110. Additionally, computer system 100 may include other subsystems (not shown) such as display subsystems, audio subsystems, networking subsystems, I/O subsystems, and/or other components.

Processor

Figure 2:
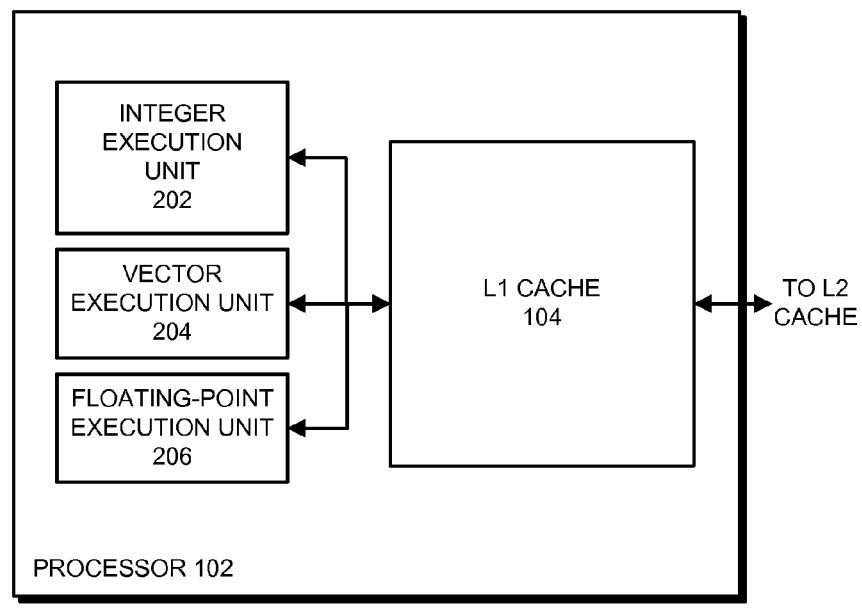
FIG. 2 presents a block diagram of a processor in accordance with the described embodiments.

FIG. 2 presents a block diagram of processor 102 in accordance with the described embodiments. As is shown in FIG. 2, processor 102 includes L1 cache 104, integer execution unit 202, vector execution unit 204, and floating-point execution unit 206 (integer execution unit 202, vector execution unit 204, and floating-point execution unit 206 as a group are herein referred to as "the execution units").

Each of execution units 202-206 is used for performing computational operations, such as logical operations, mathematical operations, or bitwise operations for an associated type of operand. More specifically, integer execution unit 202 is used for performing computational operations that involve integer operands, floating-point execution unit 206 is used for performing computational operations that involve floating-point operands, and vector execution unit 204 is used for performing computational operations that involve vector operands. Integer execution units and floating-point execution units are generally known in the art and are not described in more detail.

Figure 3:
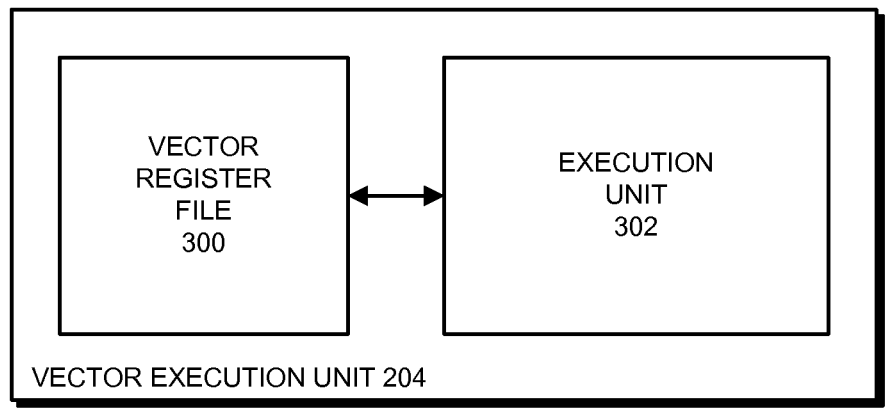
FIG. 3 presents a block diagram of a vector execution unit in accordance with the described embodiments.

In the described embodiments, vector execution unit 204 is a single-instruction-multiple-data (SIMD) execution unit that performs operations in parallel on data elements that are included in vectors of operands. FIG. 3 presents a block diagram of vector execution unit 204 in accordance with the described embodiments. As is shown in FIG. 3, vector execution unit 204 includes a vector register file 300 and an execution unit 302. Vector register file 300 includes a set of vector registers that can hold operand vectors and result vectors for execution unit 302. In some embodiments, there are 32 vector registers in the vector register file, and each register includes 128 bits. In alternative embodiments, there are different numbers of vector registers and/or different numbers of bits per register.

In the described embodiments, each data element in an input vector can contain an address, and the addresses from the elements can be used by execution unit 302 for performing a set of memory accesses in parallel.

Execution unit 302 retrieves operands from registers in vector register file 300 and executes vector instructions that cause execution unit 302 to perform operations in parallel on some or all of the data elements (or, simply, "elements") in the operand vector. For example, execution unit 302 can perform logical operations, memory operations, mathematical operations, or bitwise operations on the elements in the vector. Execution unit 302 can perform one vector operation per cycle (although the "cycle" may include more than one cycle of a clock used to trigger, synchronize, and/or control execution unit 302's computational operations).

Figure 4:
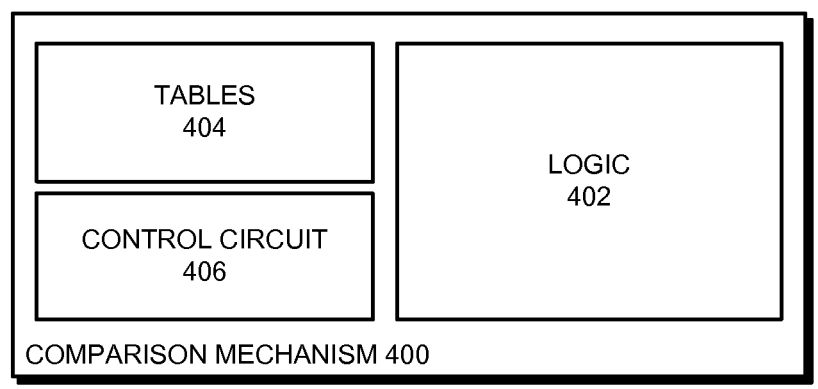
FIG. 4 presents a block diagram illustrating a comparison mechanism in accordance with the described embodiments

In the described embodiments, processor 102 comprises a comparison mechanism. FIG. 4 presents a block diagram illustrating a comparison mechanism 400 in accordance with the described embodiments. Comparison mechanism 400 performs operations for determining if memory regions addressed using two addresses, addresses A and B, overlap.

More specifically, comparison mechanism 400 can determine if overlap between the memory regions can be resolved as a function of a lower subset of the address bits in addresses A and B and/or a composite address C (which is generated using addresses A and B), or if there is no overlap between the memory regions.

As shown in FIG. 4, comparison mechanism 400 includes logic 402, tables 404, and control circuit 406. Logic 402 comprises logic circuits for generating a composite address C from addresses A and B. In addition, logic 402 comprises circuits for performing operations to determine if addresses A, B, and C (collectively, "the addresses") meet one of a set of conditions, and therefore if overlap between the memory regions addressed by addresses A and B can be determined as a function of the lower bits of addresses A, B, and/or C. Upon determining that the addresses meet one of the set of conditions, logic 402 determines if the lower subsets of addresses A, B, and/or C meet a criteria from a set of criteria, and, based on this determination, resolves whether the memory regions addressed by addressed A and B overlap.

Tables 404 comprise a memory that can hold records of the set of conditions and the set of criteria that are used by logic 402 in determining if the addresses overlap. Control circuit 406 comprises one or more circuits for configuring comparison mechanism 400 and/or controlling the operation of comparison mechanism 400.

Note that although we describe comparison mechanism 400 using a set of components, in some embodiments, comparison mechanism 400 includes a different number and/or different types of components. Generally, comparison mechanism 400 includes sufficient circuits/mechanisms/components to perform the determination whether memory regions addressed using two addresses overlap (using the operations described throughout this specification).

Although we describe processor 102 as including a particular set of units, in alternative embodiments, processor 102 can include different numbers or types of units. Moreover, although the embodiment shown in FIG. 2 is limited to a particular set of functional blocks, in the described embodiments, processor 102 can include other functional blocks, such as an instruction fetch unit, a branch unit, a memory execution unit, a memory management unit, I/O interfaces, etc. The additional functional blocks that can be present in processor 102 are known in the art and are not described in more detail.

An Example of Determining if Addresses Overlap

The described embodiments can determine if a first memory region addressed using first address A overlaps a second memory region addressed using a second address B. When determining if addressed memory regions overlap, comparison mechanism 400 first generates a composite address C that is the result of an exclusive-OR (XOR) of addresses A and B. Comparison mechanism 400 then performs a number of operations using addresses A, B, and C (collectively, "the addresses") to determine if the addresses meet a condition from a set of conditions. When the addresses do not meet one of the conditions, the comparison mechanism determines that there is no overlap. Otherwise, when the addresses meet one of the conditions, comparison mechanism 400 determines that overlap between the memory regions addressed using addresses A and B can be determined as a function of lower subsets of the address bits from addresses A, B, and/or C. Comparison mechanism 400 then determines if the lower subsets of the address bits from addresses A, B, and/or C meet a criteria from a set of criteria, and, based on the determination, determines if the addressed memory regions overlap.

In the following example, operations are described for determining if memory regions addressed by addresses A and B overlap. The example uses addresses for a 4-byte data region (e.g., a doubleword) with 2 address bits. However, the described embodiments can be extended to check for overlap between addresses for other data region sizes and/or number of address bits. More specifically, the described embodiments can check for overlap in addresses for any number of address bits N and/or data region size in bytes S.

In the examples, the "critical bits" are the lowest ($\log_2$ (S)+1) bits of the addresses. Generally, the critical bits are a group of the lower bits of each address that are useful in determining if the addresses overlap. Because the size S of the data region in the examples is 4 bytes, S=4 and $\log_2$ (S)=2, and $\log_2$ (S)+1=3. Thus, the critical bits in the example below are the lowest 3 bits. Note that, in this description, the critical bits of the address are interchangeably referred to as the "lower bits" or the "lower subset of the bits" for the address, and the remaining bits are interchangeably referred to as the "upper bits" or the "upper subset of the bits" for the address.

In addition, the addresses themselves are described as "overlapping" in the following examples as shorthand that indicates that the memory regions addressed using the addresses are overlapping. In addition, instead of referring to the above-described composite address C, these examples use an "(A^R)" notation that indicates the composite address C by the operation that is used to generate the composite address C.

When determining whether addresses A and B overlap, comparison mechanism 400 first determines if bits [$\log_2$ (S)+1 . . . N−1] of the result of the operation (A^B) (i.e., the above-described composite address C) are equal to zero, and hence the upper bits of addresses A and B match. If so, comparison mechanism 400 determines if the critical bits of (A^B) have the value of the size S of the data region (i.e., because the data region is 4 bytes in size, the critical bits of (A^B) have the value of 100), and hence the critical bits of addresses A and B match from bits [0 . . . $\log_2$ (S)−1], but mismatch in bit [$\log_2$ (S)]. If so, overlap does not exist between addresses A and B. The following shows this case:

| Example 1: Upper bits of A^B (composite address C) are zero and A^B in critical bits is 100. |   |
| --- | --- |
| 0000000000 | = A |
| 0000000100 | = B |
| 0000000100 | = A^B (composite address C) |
| ******* | = Upper Bits |
| *** | = Critical Bits |
| 0 | = Overlap |

Otherwise, when the upper bits of addresses A and B match and the critical bits of (A^B) do not have the value of size S (i.e., because the data region is 4 bytes in size, the critical bits of (A^B) do not have the value of 100), comparison mechanism 400 determines overlap as a function of the lower bits of addresses A, B, and/or C. For example, in some embodiments, comparison mechanism 400 can evaluate the addresses to determine if the lower bits meet the following criteria:

(A^B == 11x)&(A[2] == A[1]) | (A^B == 101) & (A[2] == A[0]), where "x" = don't care.

Overlap is indicated in this case when the criteria are not met and no overlap is indicated when the criteria are met. The following shows this case:

| Example 2: Upper bits of A^B are zero and A^B in critical bits is not 100. |   |
| --- | --- |
| 0000000000 | = A |
| 0000000101 | = B |
| 0000000101 | = A^B |
| ******* | = Upper Bits |
| *** | = Critical Bits |
| 0 | = Overlap |

When the upper bits of addresses A and B mismatch, comparison mechanism 400 first determines if bit [$\log_2$ (S)] of (A^B) is set. If not, comparison mechanism 400 determines that there is no overlap. The following shows this case:

| Example 3: Upper bits of A^B are non-zero, and bit 2 (i.e., bit $\log_2$ (S)) is not set. |   |
| --- | --- |
| 0000001111 | = A |
| 0000011111 | = B |
| 0000010000 | = A^B |
| ******* | = Upper Bits |
| * | = Bit $\log_2$ (S) |
| 0 | = Overlap |

When the upper bits of addresses A and B mismatch and bit [$\log_2$ (S)] of (A^B) is set, comparison mechanism 400 determines the first bit position z, where bit position z is the rightmost bit position within the upper subset of address bits for the first address A and the second address B where A[x]!=A [$\log_2$ (S)] or B[x]!=B[$\log_2$ (S)]. If no such bit position z is found, comparison mechanism 400 determines overlap as a function of the lower bits of addresses A, B, and/or C. For example, in some embodiments, comparison mechanism 400 can evaluate the addresses to determine if the lower bits meet the above-described criteria. Overlap is indicated in this case when the criteria are met and no overlap is indicated when the criteria are not met. The following shows this case:

| Example 4: Upper bits of A^B are non-zero, bit 2 (i.e., bit $\log_2$ (S)) is set, and no bit position z detected. |   |
| --- | --- |
| 1111111111 | = A |
| 0000000001 | = B |
| 1111111110 | = A^B |
| *** | = Critical Bits |
| ******* | = Upper Bits |
| * | = Bit $\log_2$ (S) |
|  | No z Detected |
| 1 | = Overlap |

Otherwise, if a bit position z is found in address A or B, when z is detected in the most-significant bit (MSB) (i.e., bit N−1) and A[z]!=B[z], comparison mechanism 400 determines overlap as a function of the lower bits of addresses A, B, and/or C. For example, in some embodiments, comparison mechanism 400 can evaluate the addresses to determine if the lower bits meet the above-described criteria. Overlap is indicated in this case when the criteria are met and no overlap is indicated when the criteria are not met. The following shows this case:

Example 4: Upper bits of A^B are non-zero, bit 2
(i.e., bit log$_2$ (S)) is set, z = MSB, mismatch at z.

```
0111111111    = A
1000000011    = B
1111111100    = A^B
       ***    = Critical Bits
*******       = Upper Bits
      *       = Bit log$_2$ (S)
*             = Bit z = 9
            1 = Mismatch at z
            0 = Overlap
```

Additionally, if a bit position z is found in address A or B, when z is detected in any bit position from bit [log$_2$ (S)+ 1 ... N−2], and A[z]==B[z], and all bits higher than position z in (A^B) are equal to zero, no overlap exists between A and B. The following shows this case:

Example 5: Upper bits of A^B are non-zero,
bit 2 (i.e., bit log$_2$ (S)) is set, z = 5, no mismatch
at z, bits above z in A^B are zero: Overlap = 0

```
0000111111    = A
0000100000    = B
0000011111    = A^B
*******       = Upper Bits
      *       = Bit log$_2$ (S)
    *         = Bit z = 5
            0 = Overlap
```

Moreover, if a bit position z is found in address A or B, when z is detected in any bit position from bit [log$_2$ (S)+ 1 ... N−2], and A[z]!=B[z], and all bits higher than position z in (A^B) are equal to zero, comparison mechanism 400 determines overlap as a function of the lower bits of addresses A, B, and/or C. For example, in some embodiments, comparison mechanism 400 can evaluate the addresses to determine if the lower bits meet the above-described criteria. Overlap is indicated in this case when the criteria are met and no overlap is indicated when the criteria are not met. The following shows this case:

Example 6: Upper bits of A^B are non-zero, bit 2 (i.e., bit log$_2$ (S))
is set, z = 5, A and B mismatch at z, and bits above z in A^B are zero.

```
0000011111    = A
0000100000    = B
0000111111    = A^B
*******       = Upper Bits
      *       = Bit log$_2$ (S)
    *         = Bit z = 5
            1 = Overlap
```

Although we present these examples, alternative embodiments may use other comparison, logical, mathematical, and/or bitwise operations to determine if comparison mechanism 400 can determine overlap as a function of addresses A, B, and/or C. Additionally, the criteria for determining that addresses A and B overlap can be different. In some embodiments, the conditions used to determine if overlap can be determined as a function of the lower bits of addresses A, B, and/or C can be configured in accordance with the criteria (and hence can also be different than the conditions in the examples above).

Criteria for Determining Overlap

As described above, when addresses A, B, and/or C meet certain conditions, comparison mechanism 400 determines overlap using a lower subset of address bits from addresses A, B, and/or C. In these embodiments, determining overlap using the lower subset of the address bits from addresses A, B, and/or C comprises determining if the lower subset of the address bits from addresses A, B, and/or C meet one or more criteria, and therefore can be determined to overlap (or not overlap).

Determining if the lower subset of the address bits from addresses A, B, and/or C meet a criteria generally comprises performing a number of comparison and logical operations that determine if the lower subset of the address bits from addresses A and C (or B and C) meet the criteria. For example, the described embodiments can determine if the lower subset of address C conforms to a given bit pattern and if the lower subset of address A (or B) conforms to a corresponding logical operation. The following examples show criteria that can be used in some embodiments.

Note that, if and only if (iff) addresses A and B differ in both bit x and bit y, then A[x]=A[y] is equivalent to B[x]=B[y]. Thus, some embodiments only check the bits of one of addresses A and B when determining if the addresses meet the criteria—because the expression, for example, (A^B)==10001 & A[4]==A[0] is equivalent to (A^B)==10001 & B[4]==B[0]. Therefore, for clarity, the following describes the criteria using only address A. However, these conditions could be described using address B in a similar way.

For the following examples, recall that the result of (A^B) is the above-described composite address C, and hence the determinations involving (A^B) can be equivalently described using the composite address C in place of (A^B). Additionally recall that the critical bits are bits [0 ... log$_2$ (S)] of the addresses, and are interchangeably referred to as the lower subset of the bits of the addresses or simply the lower bits in this description.

When addresses A and B are directed to 2-byte memory regions, the criteria are met if the following condition is true in the critical bits:

(A^B)==11 & A[1]==A[0]

When addresses A and B are directed to 4-byte memory regions, the criteria are met if any of the following conditions are true in the critical bits:

(A^B)==11x & A[2]==A[1]

(A^B)==101 & A[2]==A[0]

When addresses A and B are directed to 8-byte memory regions, the criteria are met if any of the following conditions are true in the critical bits:

(A^B)==11xx & A[3]==A[2]

(A^B)==101x & A[3]==A[1]

(A^B)==1001 & A[3]==A[0]

When addresses A and B are directed to 16-byte memory regions, the criteria are met if any of the following conditions are true in the critical bits:

(A^B)==11xxx & A[4]==A[3]

(A^B)==101xx & A[4]==A[2]

(A^B)==1001x & A[4]==A[1]

(A^B)==10001 & A[4]==A[0]

In the described embodiments, for larger memory regions, the above-described progression (i.e., the pattern in the bits that are used) continues in a similar way. Generally, the progression can be extended using the similar patterns for any power-of-2 memory region.

Although we present these examples of criteria, the described embodiments can use different criteria for determining that addresses A and B overlap. Moreover, in some embodiments, the conditions used to determine if overlap can be determined as a function of the lower bits of addresses A, B, and/or C can be configured in accordance with the criteria.

Pseudocode Example for Determining Overlap

The following pseudocode sample provides a example of a process that can be used to determine if addresses A and B overlap. For clarity, we refer to addresses A and B in the code sample simply as variables "x" and "y" respectively.

```
Overlap(x,y):
int x,y,z,overlap;
int bx[BITS],by[BITS],matchDown[BITS];
int matchUpper;
for (z=0; z<BITS; ++z)
{
    bx[z] = (x >> z) & 1;
    by[z] = (y >> z) & 1;
}
matchUpper = 1;
for (z=kCriticalBits; z<BITS; ++z)
    matchUpper &= (bx[z] == by[z]);
matchDown[BITS-1] = (bx[BITS-1] == by[BITS-1]);
for (z=BITS-2; z>=0; --z)
    matchDown[z] = (matchDown[z+1] && bx[z] ==
    by[z]);
    overlap = 0;
if (matchUpper)
{
    if (((x ^ y) & kCriticalBitMask) ==
    (1<<kAddrSizeBits))
        overlap = 0;
    else
        overlap = !Func(x,y);
}
else if (bx[kAddrSizeBits] != by[kAddrSizeBits])
{
    for (z=kCriticalBits; z<BITS; ++z)
        if (bx[z] != bx[kAddrSizeBits] || by[z] !=
        by[kAddrSizeBits])
            break;
    if (z >= BITS || bx[z] != by[z])
    {
        if (z>=BITS-1 || matchDown [z+1])
        {
            overlap = Func(x,y);
        }
        else overlap = 0;
    }
    else overlap = 0;
}
else overlap = 0;
```

Although we present an example of pseudocode that can be used to implement an embodiment, alternative embodiments could be described using different pseudocode to implement similar functions. The general functions of the described embodiments are recited throughout the specification of this application.

Process for Determining Overlap

Figure 5:
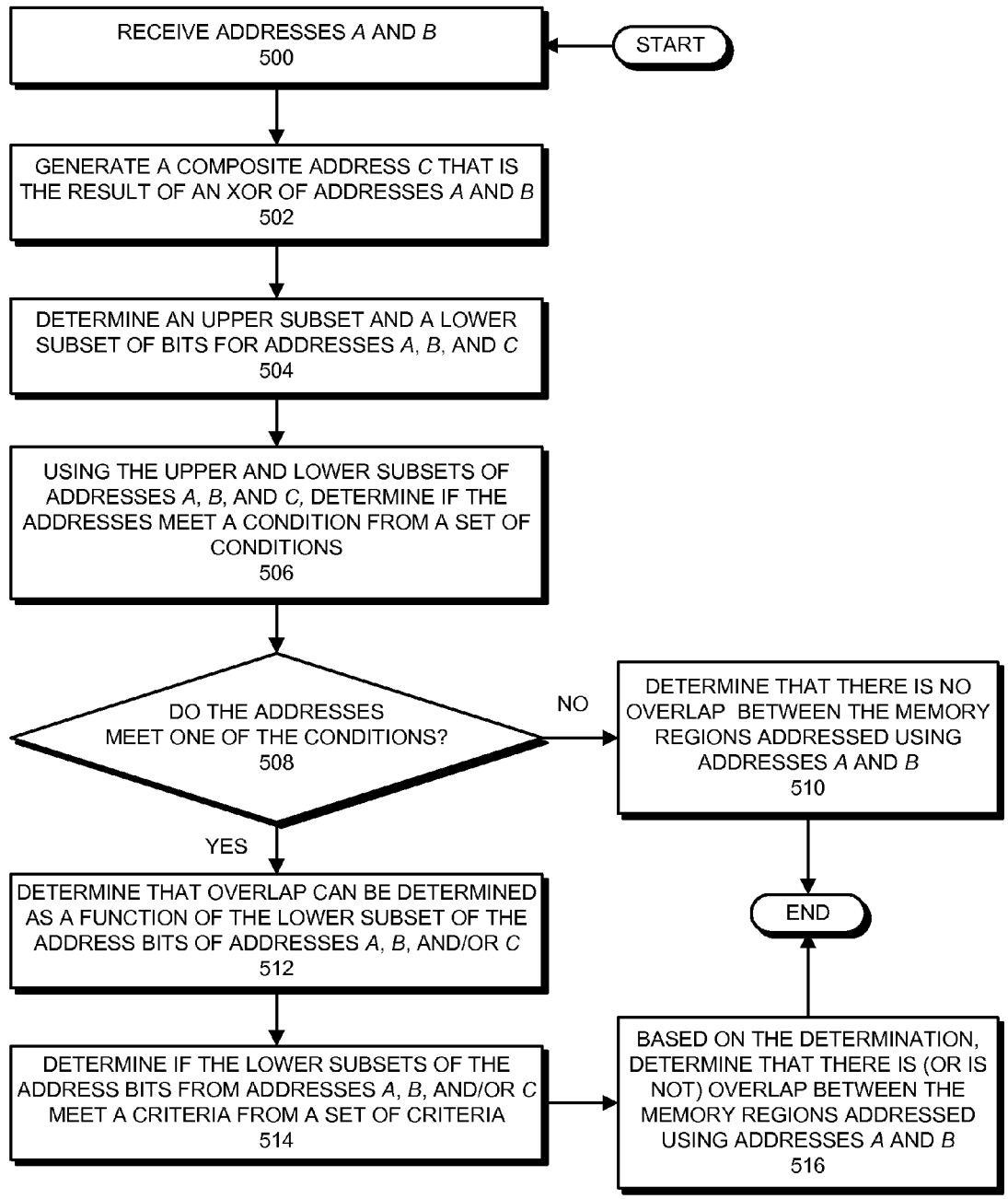
FIG. 5 presents a flowchart illustrating a process for determining overlap between two addressed memory regions in accordance with the described embodiments.

FIG. 5 presents a flowchart illustrating a process for determining overlap between two addressed memory regions in accordance with the described embodiments. More specifically, the process described with respect to FIG. 5 determines if a first memory region addressed using first address A overlaps a second memory region addressed using a second address B, wherein the memory regions are of size S and addresses A and B comprise N bits.

The process starts when comparison mechanism 400 in processor 102 receives addresses A and B (step 500). In the described embodiments, addresses A and B can be received as inputs for an instruction being executed by processor 102. For example, in some embodiments, addresses A and B are addresses from one or more input vectors for a vector memory-accessing instruction (e.g., a vector read or vector write instruction). In these embodiments, comparison mechanism 400 may perform the comparison operation in parallel for a large number of addresses in parallel, e.g., may compare each element of two M-element vector instructions in parallel. However, processor 102 need not receive addresses A and B as inputs for a vector instruction. Generally, anytime processor 102 is to compare two addresses to determine whether the addressed memory regions overlap, the following operations can be used.

Comparison mechanism 400 then generates a composite address C that is the result of an exclusive-OR (XOR) of addresses A and B (step 502). Comparison mechanism 400 next determines an upper subset and a lower subset of the bits in the addresses, wherein the addresses comprise the composite address C, the first address A, and the second address B (step 504). For example, in some embodiments, for the lower subset, comparison mechanism 400 can determine a subset that consists of bits $[0 \ldots \log_2 (S)]$ in the addresses and for the upper subset, comparison mechanism 400 can determine a subset that consists of bits $[\log_2 (S)+1 \ldots N-1]$ in the addresses. Note that the upper subset and the lower subset, which is interchangeably referred to as the "critical bits," are determined based on the size S.

Comparison mechanism 400 then uses the upper and lower subsets of addresses A, B, and C (collectively, "the addresses") to determine if the addresses meet a condition from a set of conditions (step 506). Some exemplary conditions and operations are described in the above-recited examples. When the addresses do not meet one of the conditions (step 508), comparison mechanism 400 determines that there is no overlap between the memory regions addressed using addresses A and B (step 510).

However, when the addresses meet one of the conditions (step 508), comparison mechanism 400 determines that overlap can be detected as a function of the lower subsets of the address bits of addresses A, B, and/or C (step 512). Comparison mechanism 400 then determines if the lower subsets of address bits from addresses A, B, and/or C meet a criteria from a set of criteria (step 514). More specifically, logic 402 in comparison mechanism performs one or more logical, comparison, or combinatorial operations to determine if the lower subsets of address bits from addresses A, B, and/or C meet a criteria from a set of criteria. Some exemplary criteria and operations are described in the above-recited examples.

Based on the determination whether the lower subsets of address bits from addresses A, B, and/or C meet the criteria, comparison mechanism 400 determines that there is (or is not) overlap between the memory regions addressed using addresses A and B (step 516). As shown in the examples above, depending on the nature of the address bits in each of the addresses, overlap can be found either when the criteria are met or when they are not met. The determination in step 516 is made accordingly.

Note that, although some example conditions are described above, alternative embodiments use different conditions. Generally, the conditions used to determine if overlap can be determined as a function of the lower bits of addresses A, B, and/or C can be configured in accordance with the criteria (i.e., can be configured to indicate when overlap can be determined using the criteria).

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for determining if memory regions addressed using a first address and a second address overlap, comprising:
    receiving the first address for a first memory region and the second address for a second memory region, wherein each address comprises N bits and where the memory regions are of size S;
    generating a composite address, wherein the composite address is a result of an exclusive-OR (XOR) of the first address and the second address;
    determining an upper subset and a lower subset of the bits in the addresses based on the size S, wherein the addresses comprise the composite address, the first address, and the second address; and
    using the upper subset and the lower subset of the bits in the addresses to determine if the memory regions overlap.

2. The method of claim 1, wherein determining the upper subset and the lower subset of the bits in the addresses comprises:
    for the lower subset, determining a subset that consists of bits [0 ... $\log_2$ (S)] in the addresses; and
    for the upper subset, determining a subset that consists of bits [$\log_2$ (S)+1 ... N−1] in the addresses.

3. The method of claim 2, wherein using the upper subset and the lower subset of the bits in the addresses to determine if the memory regions overlap comprises:
    upon determining that the upper subset of the bits in the composite address are all 0,
        if the lower subset in the composite address has a value of size S, determining that the first memory region and the second memory region do not overlap;
        otherwise, if the lower subset in the composite address does not have a value of size S, determining that the memory regions overlap when none of a set of criteria is met by the lower subset of the bits of the addresses, and determining that the memory regions do not overlap when one or more of the set of criteria is met by the lower subset of the bits of the addresses.

4. The method of claim 3, wherein the method further comprises performing one or more logical, combinatorial, or comparison operations to determine if the lower subset of the bits of the addresses meet the criteria.

5. The method of claim 3, wherein using the upper subset and the lower subset of the bits in the addresses to determine if the memory regions overlap comprises:
    upon determining that the upper subset of the bits in the composite address are not all 0 and that bit [$\log_2$ (S)] of the lower subset in the composite address is 0, determining that the memory regions do not overlap.

6. The method of claim 5, wherein using the upper subset and the lower subset of the bits in the addresses to determine if the memory regions overlap comprises:
    upon determining that the upper subset of the bits in the composite address are not all 0 and that bit [$\log_2$ (S)] of the lower subset in the composite address is 1,
        determining a bit position z, where bit position z is the rightmost bit position within the upper subset of address bits for the first address A and the second address B where A[x]!=A [$\log_2$(S)] or B[x]!=B[$\log_2$(S)]; and
        upon determining that bit position z does not exist, or exists and has a predetermined property, determining that the memory regions overlap when one or more of the set of criteria is met by the lower subset of the bits of the addresses, and determining that the memory regions do not overlap when none of the set of criteria is met by the lower subset of the bits of the addresses.

7. The method of claim 6, wherein determining that bit position z has the predetermined property comprises determining that:
    bit position z is bit [N−1] and bit position z of the composite address is 1; or
    bit position z is found, bit position z of the composite address is 1, and all bits higher than bit z of the composite address are 0.

8. The method of claim 6, wherein the method further comprises:
    upon determining that bit position z exists and does no have the predetermined property, determining that the memory regions do not overlap.

9. The method of claim 6, wherein the method further comprises performing one or more logical, combinatorial, or comparison operations to determine if the lower subset of the bits of the addresses meet the criteria.

10. The method of claim 2, wherein using the upper subset and the lower subset of the bits in the addresses to determine if the memory regions overlap comprises:
    using the upper subset and the lower subset of the bits in the addresses, determining that the addresses meet a condition from a set of conditions;
    determining whether the lower subset of the bits in the addresses meet one or more criteria from a set of criteria; and
    based on the determination whether the lower subset of the bits in the addresses meet one or more criteria from the set of criteria, determining that the memory regions overlap or do not overlap.

11. The method of claim 10, wherein the method further comprises:
    determining that the memory regions do not overlap when the upper subset and the lower subset of the bits in the addresses do not meet a condition from a set of conditions.

12. The method of claim 10,
    wherein determining that the addresses meet a condition comprises:
        determining that the bits of the upper subset of the composite address are 0, and that a value in the lower subset of the composite address does not have a value of size S; and
    wherein determining that the memory regions overlap or do not overlap comprises:
        determining that the memory regions overlap when the lower subset of the bits of the addresses do not meet a criteria, and determining that the memory regions do not overlap when the lower subset of the bits of the addresses meet a criteria.

13. The method of claim 12, wherein determining whether the lower subset of the bits of the addresses meet one or more criteria from the set of criteria comprises:
  performing one or more logical, combinatorial, or comparison operations to determine if the lower subset of the bits of the addresses meet the criteria.

14. The method of claim 10,
  wherein determining that the addresses meet a condition comprises:
    determining that one or more bits in the upper subset of the composite address is 1, that bit $[\log_2(S)]$ of the composite address is 1, and, for a bit position z, where bit position z is the rightmost bit position within the upper subset of address bits for the first address A and the second address B where $A[x]!=A[\log_2(S)]$ or $B[x]!=B[\log_2(S)]$, that one of the following conditions is met:
      there is no bit position z;
      bit position z is at bit [N−1] and bit position z of the composite address is 1; or
      bit position z exists, bit position z of the composite address is 1, and bits above bit position z in the composite address are 0; and
  wherein determining that the memory regions overlap or do not overlap comprises:
    determining that the memory regions overlap when the lower subset of the bits of the addresses meet a criteria, and determining that the memory regions do not overlap when the lower subset of the bits of the addresses do not meet a criteria.

15. The method of claim 14, wherein determining whether the lower subset of the bits of the addresses meet one or more criteria from the set of criteria comprises:
  performing one or more logical, combinatorial, or comparison operations to determine if the lower subset of the bits of the addresses meet the criteria.

16. A processor that determines if memory regions addressed using a first address and a second address overlap, comprising:
  a comparison mechanism, wherein the comparison mechanism is configured to:
    receive the first address for a first memory region and the second address for a second memory region, wherein each address comprises N bits and where the memory regions are of size S;
    generate a composite address, wherein the composite address is a result of an exclusive-OR (XOR) of the first address and the second address;
    determine an upper subset and a lower subset of the bits in the addresses based on the size S, wherein the addresses comprise the composite address, the first address, and the second address; and
    use the upper subset and the lower subset of the bits in the addresses to determine if the memory regions overlap.

17. The processor of claim 16, wherein, when determining the upper subset and the lower subset of the bits in the addresses, the comparison mechanism is configured to:
  for the lower subset, determine a subset that consists of bits $[0 \ldots \log_2(S)]$ in the addresses; and
  for the upper subset, determine a subset that consists of bits $[\log_2(S)+1 \ldots N-1]$ in the addresses.

18. The processor of claim 17, wherein, when using the upper subset and the lower subset of the bits in the addresses to determine if the memory regions overlap, upon determining that the upper subset of the bits in the composite address are all 0,
  if the lower subset in the composite address has a value of size S, the comparison mechanism is configured to determine that the first memory region and the second memory region do not overlap;
  otherwise, if the lower subset in the composite address does not have a value of the size S, the comparison mechanism is configured to determine that the memory regions overlap when none of a set of criteria is met by the lower subset of the bits of the addresses, and determine that the memory regions do not overlap when one or more of the set of criteria is met by the lower subset of the bits of the addresses.

19. The processor of claim 18, wherein the comparison mechanism is configured to perform one or more logical, combinatorial, or comparison operations to determine if the lower subset of the bits of the addresses meet the criteria.

20. The processor of claim 18, wherein, when using the upper subset and the lower subset of the bits in the addresses to determine if the memory regions overlap, upon determining that the upper subset of the bits in the composite address are not all 0 and that bit $[\log_2(S)]$ of the lower subset in the composite address is 0, the comparison mechanism is configured to determine that the memory regions do not overlap.

21. The processor of claim 20, wherein, when using the upper subset and the lower subset of the bits in the addresses to determine if the memory regions overlap, upon determining that the upper subset of the bits in the composite address are not all 0 and that bit $[\log_2(S)]$ of the lower subset in the composite address is 1, the comparison mechanism is configured to determine a bit position z, where bit position z is the rightmost bit position within the upper subset of address bits for the first address A and the second address B where $A[x]!=A[\log_2(S)]$ or $B[x]!=B[\log_2(S)]$; and
  upon determining that bit position z does not exist, or exists and has a predetermined property, the comparison mechanism is configured to determine that the memory regions overlap when one or more of the set of criteria is met by the lower subset of the bits of the addresses, and determine that the memory regions do not overlap when none of the set of criteria is met by the lower subset of the bits of the addresses.

22. The processor of claim 21, wherein, when determining that bit position z has the predetermined property, the comparison mechanism is configured to determine that:
  bit position z is in bit [N−1] and bit position z of the composite address is 1; or
  bit position z is found, bit position z of the composite address is 1, and all bits higher than bit z of the composite address are 0.

23. The processor of claim 21, wherein, upon determining that bit position z exists and does not have the predetermined property, the comparison mechanism is configured to determine that the memory regions do not overlap.

24. The processor of claim 21, wherein the comparison mechanism is configured to perform one or more logical, combinatorial, or comparison operations to determine if the lower subset of the bits of the addresses meet the criteria.

25. The processor of claim 17, wherein, when using the upper subset and the lower subset of the bits in the addresses to determine if the memory regions overlap, the comparison mechanism is configured to:
  determine that the addresses meet a condition from a set of conditions using the upper subset and the lower subset of the bits in the addresses;
  determine whether the lower subset of the bits in the addresses meet one or more criteria from a set of criteria; and based on the determination whether the lower subset of the bits in the addresses meet one or more criteria from the set of criteria, determine that the memory regions overlap or do not overlap.

26. The processor of claim 25, wherein the comparison mechanism is further configured to determine that the memory regions do not overlap when the upper subset and the lower subset of the bits in the addresses do not meet a condition from a set of conditions.

27. The processor of claim 25, wherein, when determining that the upper subset and the lower subset of the bits in the addresses meet a condition, the comparison mechanism is configured to determine that the bits of the upper subset of the composite address are 0, and that the lower subset of the composite address has a value of size S; and wherein, when determining that the memory regions overlap or do not overlap, the comparison mechanism is configured to determine that the memory regions overlap when the lower subset of the bits of the addresses do not meet a criteria, and determine that the memory regions do not overlap when the lower subset of the bits of the addresses meet a criteria.

28. The processor of claim 27, wherein, when determining whether the lower subset of the bits of the addresses meet one or more criteria from the set of criteria, the comparison mechanism is configured to perform one or more logical, combinatorial, or comparison operations to determine if the lower subset of the bits of the addresses meet the criteria.

29. The processor of claim 25, wherein, when determining that the addresses meet a condition, the comparison mechanism is configured to determine that one or more bits in the upper subset of the composite address is 1, that bit $[\log_2(S)]$ of the composite address is 1, and, for a bit position z, where bit position z is the rightmost bit position within the upper subset of address bits for the first address A and the second address B where $A[x]!=A[\log_2(S)]$ or $B[x]!=B[\log_2(S)]$, that one of the following conditions is met: there is no bit position z; bit position z is at bit $[N-1]$ and bit position z of the composite address is 1; or bit position z exists, bit position z of the composite address is 1, and bits above bit position z in the composite address are 0; and wherein, when determining that the memory regions overlap or do not overlap, the comparison mechanism is configured to determine that the memory regions overlap when the lower subset of the bits of the addresses meet a criteria, and determine that the memory regions do not overlap when the lower subset of the bits of the addresses do not meet a criteria.

30. The processor of claim 29, wherein, when determining whether the lower subset of the bits of the addresses meet one or more criteria from the set of criteria, the comparison mechanism is configured to perform one or more logical, combinatorial, or comparison operations to determine if the lower subset of the bits of the addresses meet the criteria.

31. A computer system that determines if a memory regions addressed using a first address and a second address overlap, comprising:
a processor;
a memory coupled to the processor, wherein the memory stores instructions and data for the processor; and
a comparison mechanism in the processor, wherein the comparison mechanism is configured to:
receive the first address for a first memory region and the second address for a second memory region, wherein each address comprises N bits and where the memory regions are of size S;
generate a composite address, wherein the composite address is a result of an exclusive-OR (XOR) of the first address and the second address;
determine an upper subset and a lower subset of the bits in the addresses based on the size S, wherein the addresses comprise the composite address, the first address, and the second address; and
use the upper subset and the lower subset of the bits in the addresses to determine if the memory regions overlap.

32. The computer system of claim 31, wherein, when determining the upper subset and the lower subset of the bits in the addresses, the comparison mechanism is configured to:
for the lower subset, determine a subset that consists of bits $[0 \ldots \log_2(S)]$ in the addresses; and
for the upper subset, determine a subset that consists of bits $[\log_2(S)+1 \ldots N-1]$ in the addresses.

33. The computer system of claim 32, wherein, when using the upper subset and the lower subset of the bits in the addresses to determine if the memory regions overlap, the comparison mechanism is configured to:
determine that the addresses meet a condition from a set of conditions using the upper subset and the lower subset of the bits in the addresses;
determine whether the lower subset of the bits in the addresses meet one or more criteria from a set of criteria; and
based on the determination whether the lower subset of the bits in the addresses meet one or more criteria from the set of criteria, determine that the memory regions overlap or do not overlap.

34. The computer system of claim 33, wherein the comparison mechanism is further configured to determine that the memory regions do not overlap when the upper subset and the lower subset of the bits in the addresses do not meet a condition from a set of conditions.

35. The computer system of claim 33, wherein, when determining that the upper subset and the lower subset of the bits in the addresses meet a condition, the comparison mechanism is configured to determine that the bits of the upper subset of the composite address are 0, and that the lower subset of the composite address has a value of size S; and wherein, when determining that the memory regions overlap or do not overlap, the comparison mechanism is configured to determine that the memory regions overlap when the lower subset of the bits of the addresses do not meet a criteria, and determine that the memory regions do not overlap when the lower subset of the bits of the addresses meet a criteria.

36. The computer system of claim 35, wherein, when determining whether the lower subset of the bits of the addresses meet one or more criteria from the set of criteria, the comparison mechanism is configured to perform one or more logical, combinatorial, or comparison operations to determine if the lower subset of the bits of the addresses meet the criteria.

37. The computer system of claim 33, wherein, when determining that the addresses meet a condition, the comparison mechanism is configured to determine that one or more bits in the upper subset of the composite address is 1, that bit $[\log_2(S)]$ of the composite address is 1, and, for a bit position z, where bit position z is the rightmost bit position within the upper subset of address bits for the first address A and the second address B where $A[x]!=A[\log_2(S)]$ or $B[x]!=B[\log_2(S)]$, that one of the following conditions is met: there is no bit position z; bit position z is at bit $[N-1]$ and bit position z of the composite address is 1; or bit position z exists, bit position z of the composite address is 1, and bits above bit position z in the composite address are 0; and wherein, when determining that the memory regions overlap or do not overlap, the comparison mechanism is configured to determine that the memory regions overlap when the lower subset of the bits of the addresses meet a criteria, and determine that the memory regions do not overlap when the lower subset of the bits of the addresses do not meet a criteria.

38. The computer system of claim 37, wherein, when determining whether the lower subset of the bits of the addresses meet one or more criteria from the set of criteria, the comparison mechanism is configured to perform one or more logical, combinatorial, or comparison operations to determine if the lower subset of the bits of the addresses meet the criteria.

* * * * *